United States Patent [19]

Ohta

[11] 4,337,686
[45] Jul. 6, 1982

[54] HYDRAULIC FORCE MULTIPLYING DEVICE

[75] Inventor: Yoshimoto Ohta, Ichikawa, Japan

[73] Assignee: Tokico Ltd., Kawasaki, Japan

[21] Appl. No.: 128,123

[22] Filed: Mar. 7, 1980

[30] Foreign Application Priority Data

Mar. 8, 1979 [JP] Japan .............................. 54/29762[U]
Mar. 8, 1979 [JP] Japan .............................. 54/29763[U]
Mar. 8, 1979 [JP] Japan .............................. 54/29765[U]

[51] Int. Cl.$^3$ ............................. F15B 9/10; F16J 1/10
[52] U.S. Cl. ......................................... 91/49; 91/374;
91/431; 92/129; 60/547 B
[58] Field of Search .................... 91/49, 431, 373, 372,
91/374; 92/129; 60/547 B

[56] References Cited

U.S. PATENT DOCUMENTS

| | | | |
|---|---|---|---|
| 2,957,311 | 10/1960 | Stelzer | 91/49 |
| 3,327,590 | 6/1967 | Johnson | 91/49 |
| 3,402,592 | 9/1968 | Mochon et al. | 92/129 |
| 3,444,784 | 5/1969 | Wengerd | 92/129 |
| 4,179,980 | 12/1979 | Kito et al. | 91/49 |
| 4,274,326 | 6/1981 | Peeples | 91/49 |

Primary Examiner—Paul E. Maslousky
Attorney, Agent, or Firm—Wenderoth, Lind & Ponack

[57] ABSTRACT

A hydraulic force multiplying device has a housing having an inlet port connected to a source of hydraulic pressure and an outlet port, an input rod and an output rod, one end of each of the input and output rod being slidably connected with one another within the housing, a free piston slidably disposed between the outer circumference of the input rod and the inner wall of the housing and dividing the interior of the housing into an inlet side oil chamber and an outlet side oil chamber, the free piston being associated with the output rod, a passage formed in the input rod for connecting the two oil chambers, and a valve for controlling oil flow in the passage. The valve consists of a valve member and a valve seat provided respectively on either the input or the output rod and the other of the input and output rods. The valve is formed to allow the relative movement between the input and output rods in the valve closing direction with the valve member engaging with the valve seat.

9 Claims, 6 Drawing Figures

HYDRAULIC FORCE MULTIPLYING DEVICE

BACKGROUND OF THE INVENTION

This invention relates to hydraulic force multiplying devices for use in apparatus such as hydraulic braking systems of vehicles or the like.

Various hydraulic force multiplying devices have been proposed to generate an augmented output force by utilizing hydraulic pressure. One of the prior art hydraulic force multiplying devices includes a housing having an inlet port connected to a source of hydraulic pressure and an outlet port, an input rod and an output rod the one ends of which are slidably connected with one another within the housing, a free piston slidably disposed between the outer circumference of the input rod and the inner wall of the housing and dividing the interior of the housing into an inlet side oil chamber and an outlet side oil chamber and being associated with the output rod, a passage formed in the input rod for connecting the two oil chambers, and a valve for controlling oil flow in the passage. The valve consists of a rigid valve member secured to the input rod and a valve seat formed on the output rod so that the effective passage area is throttled when the two rods approach one another. When an input force is applied to the input rod to move it into the housing the valve member on the input rod approaches the valve seat thereby reducing the passage area. A differential pressure is generated across the free piston, and a differential pressure force acting on the free piston is transmitted to the output rod.

The hydraulic force multiplying device having such a construction aforementioned operates satisfactorily in normal operating conditions. However, when the input rod is moved rapidly toward the output rod such as in emergency conditions or the like, the pressure in the inlet side oil chamber may so rapidly that the valve member engages impactively with the valve seat, and there are shortcomings such that the valve will sometimes be damaged and, further, since the force applied to the input rod is transmitted directly to the output rod, the driver of the vehicle will feel that the brake pedal is blocked.

Further, the hydraulic force multiplying device may sometimes be incorporated in a hydraulic system such that the device and one or more separate hydraulic actuating devices such as a power steering device or the like are arranged in series in the system. In such case, when the valve member engages with the valve seat, the oil flow through the outlet port will be reduced excessively or to zero, whereby the function of separate hydraulic actuating devices will be lost.

SUMMARY OF THE INVENTION

One of the objects of the present invention is to provide a hydraulic force multiplying device eliminating the first mentioned shortcomings and, according to the invention, the valve consists of a valve member and a valve seat which are provided respectively on either of the input and output rods and on the other of the two rods, and the valve is formed to allow relative movement between the input and output rods in the valve closing direction with the valve member engaging with the valve seat.

Another object of the present invention is to provide a hydraulic force multiplying device wherein a passage is formed across the valve to assure a predetermined minimum amount of oil flow between the inlet and outlet port, thereby eliminating the secondly mentioned shortcoming in the prior art device. Preferably, the passage is formed as a groove or cut-out in the valve seat or the valve member.

BRIEF DESCRIPTION OF THE DRAWINGS

The foregoing and other objects and advantages of the present invention will become apparent from the following description taken in connection with the accompanying drawings.

In the drawings.

DETAILED DESCRIPTION OF THE PREFERRED EMBODIMENTS

Figure 1:
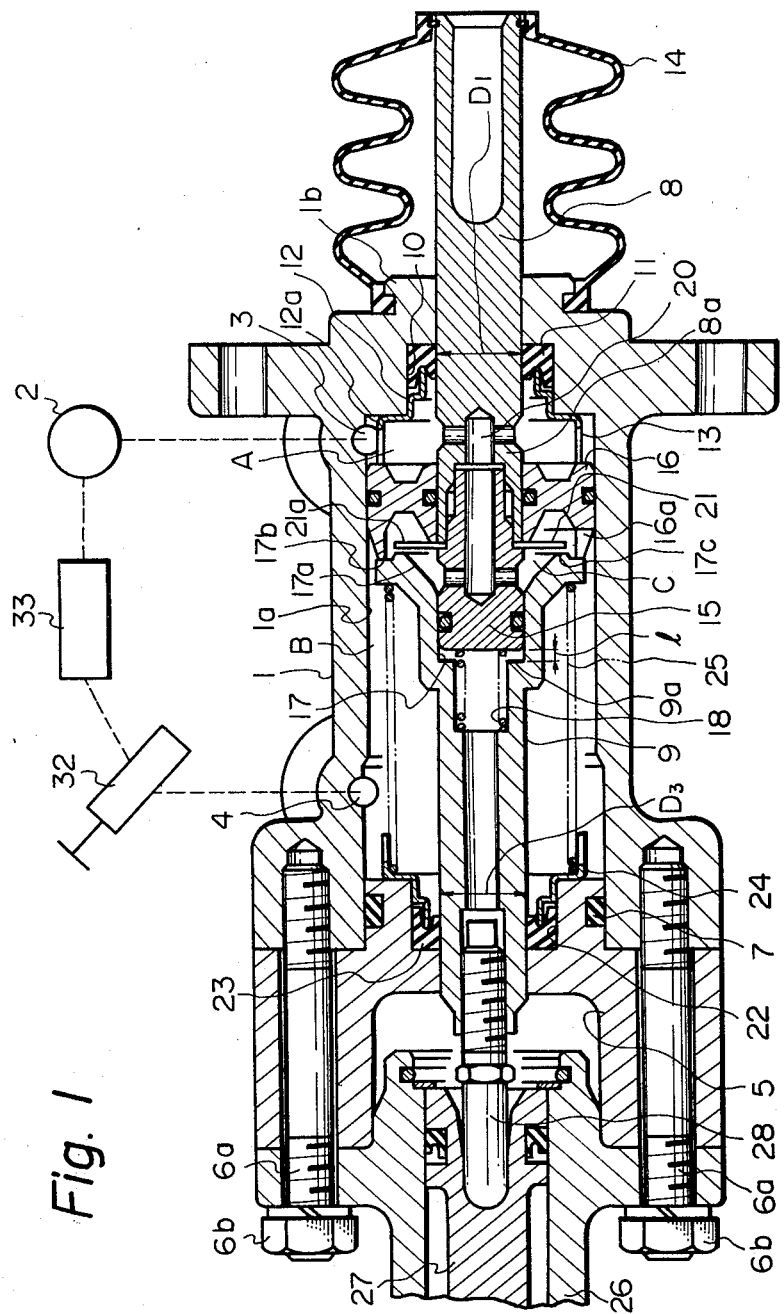
FIG. 1 is a longitudinal sectional view of a hydraulic force multiplying device according to the invention.

The hydraulic force multiplying device shown in FIG. 1 comprises a main body 1 having therein a cylinder 1a and having an inlet port 3 which is adapted to be connected to a source 2 of hydraulic pressure fluid such as a pump and an outlet port 4. The left end of the main body 1 as viewed in FIG. 1 is closed by a guide member 5. The guide member 5 is secured to the main body 1 by bolts 6a and nuts 6b to constitute with the main body 1 a housing. A seal ring 7 is disposed between the main body 1 and the guide member 5.

An input rod 8 is slidably supported by a guide portion 1b of the main body 1 with one end portion 8a being located in the housing and the other end projecting outwards. An output rod 9 is slidably supported by the guide member 5 with one end portion 9a being located adjacent to the one end portion 8a of the input rod 8. It will be noted that the outer diameter $D_1$ of the input rod 8 is equal to the outer diameter $D_3$ of the output rod 9. A counter-bored portion 10 is formed on the inner side of the guide portion 1b of the main body 1 to receive therein a cup seal 11 to provide a seal between the input rod 8 and the main body 1. The cup seal 11 is retained in its position by a retainer 12. The inner end portion 12a of the retainer 12 has an enlarged diameter and projects into the cylinder 1a to act as a stop restricting the rearward, or rightward as viewed in the drawing, movement of a free piston 16 which will hereinafter be explained. At least one cut-out portion 13 is formed in the inner end portion 12a of the retainer for permitting free oil flow therethrough. A dust boot 14 covers the input rod 8 with the opposite end being connected respectively to the main body 1 and the outer end of the input rod 8. A cylindrical nut 15 having an outer diameter equal to the outer diameter $D_1$ of the input rod 8 is threadingly secured to the inner end 8a of the input rod 8 and extends coaxially therefrom. The free piston 16 is slidably disposed between the outer circumference of the inner end portion 8a of the input rod 8 and the inner circumference of the cylinder 1a to divide the interior of the housing into inlet side oil chamber A and outlet oil chamber B.

As shown in the drawing, the end portion 9a of the output rod 9 has an increased diameter and has therein a bore portion 17 which is adapted to slidably and sealingly receive the tip end portion of the cylindrical nut 15. A coil spring 18 acts between the output rod 8 and the nut 15 to bias the nut 15 and the input rod 8 in the direction separating the nut from the output rod 9. The end portion 9a further has in sequence from the bore portion, a generally frustoconically shaped recessed portion 17a, an annular valve seat 17c and a radially extending end surface 17b. The end surface 17b is adapted to engage with the free piston 16, and the valve seat 17c cooperates with a valve member 21. The valve member 21 in this embodiment is an annular flexible disc with the inner peripheral portion thereof being clamped between and retained by the cylindrical nut 15 and the input rod 8 and the outer circumferential portion 21a cooperating with the valve seat 17c. At least one cut-out 16a is formed in the free piston 16 so that the left side surface of the piston 16 as viewed in the drawing is exposed permanently to the pressure in the oil chamber B.

In the inactuated condition of the device as shown in the drawing, an axial clearance l is provided between the bottom of the bore portion 17 and the nut 15.

A connecting passage 20 is formed in the input rod 8 and the nut 15 for permanently connecting the oil chamber A with a valve chamber C which is defined by the valve member 21, the inner surface portion 17a of the output rod 9 and the outer circumference of the nut 15. When the valve member 21 approaches the valve seat 17c in response to the movement of the input rod 8 approaching the output rod 9 or in the valve closing direction, the clearance between the outer circumferential portion 21a of the valve member 21 and the valve seat 17c is reduced thereby generating a pressure difference across the space and between the valve chamber C and the oil chamber B.

A recess or counter-bored portion 22 is formed in the guide member 5 around the output rod 9 to receive therein a cup seal 23 so as to provide a seal between the output rod 9 and the guide member 5. A retainer 24 retains the cup seal 23 in its position and the inner end portion of the retainer 24 has an increased diameter to act as a seat for a coil spring 25 which acts on the output rod 9 in the rightward direction as viewed in the drawing. It will be noted that the configuration of the retainer 24 is the same as the retainer 12a associated with the input rod 8.

In this embodiment, the output rod 9 is connected with a piston 27 of a master cylinder 26 of a hydraulic braking system through a connecting rod 28. The outlet port 4 in the main body 1 is connected with a reservoir 33 through a power steering device 32.

Now, the operation of the hydraulic force multiplying device will be explained. In the normal inactuated condition the output rod 9 urges the free piston 16 against the stop 12a by the spring 25 and the input rod 8 is biassed in the same direction by the coil spring 18 to define a predetermined clearance l between the output rod 9 and the cylindrical nut 15 which is integrally secured to the input rod 8. Since the diameter $D_1$ of the input rod 8 is equal to the diameter $D_3$ of the output rod 9 no force will act on the input rod 8 or on the output rod 9 even when the pressure in the oil chambers A and B is changed, which will occur in response to the actuation of the power steering device 32, provided that a pressure difference is not generated between the chambers A and B.

Oil supplied from the source 2 flows freely through the inlet port 3, the oil chamber A, the connecting passage 20, the valve chamber C, the oil chamber B and the outlet port 4, and through the power steering device 32 to the reservoir 33.

When an input force is applied on the input rod 8 by depressing a brake pedal, the input rod 8 moves leftward in the drawing and the valve member 21 approaches the valve seat 17c and the effective area of the annular space between the valve seat 17c and the valve member 21 is reduced thereby generating a throttling action. The pressure in the valve chamber C increases and a differential pressure acts across the free piston 16. The output rod 9 is moved leftward in the drawing by the differential pressure acting on the free piston and between the oil chambers A and B and also by the differential pressure force acting on the output rod and between the chambers C and B. The piston 27 of the master cylinder 26 is actuated by the output rod 9.

The pressure in the valve chamber C acts also on the input rod 8 through the valve member 21 to counteract the input force thereby generating a pedal feeling. When the input force is increased the clearance between the valve member and the valve seat is decreased and the pressure in the chambers A and C increases. It will be noted that in the normal operating conditions, the clearance between the valve member 21 and the valve seat 17c will not be reduced to zero since the output rod 9 can move leftward in response to the leftward movement of the input rod 8.

When the brake pedal is rapidly depressed, the valve member 21 may impactively engage with the valve seat 17c. However, according to the invention, the input rod will displace relative to the output rod in the valve closing direction by some amount with the valve member engaging with the valve seat, so that the impactive engagement between the input and the output rods can be prevented thereby protecting the valve member and valve seat from excessive wear or the like. In this embodiment, the valve member 21 is a resilient disc and a predetermined clearance l is formed to allow a relative displacement between the input and output rods.

Figure 2:
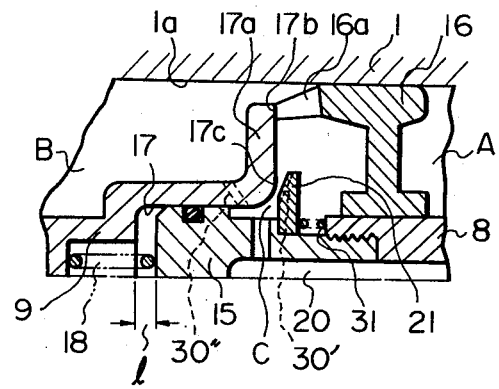
FIG. 2 is a partial sectional view showing the essential portion of a second embodiment of the invention.

In the second embodiment illustrated in FIG. 2, an annular rigid valve member 21 is slidably mounted on the cylindrical nut 15 and a coil spring 31 acts on the valve member 21 to urge it toward the valve seat 17c. Similar to the first embodiment, a predetermined clearance l is formed to allow the relative movement between the input rod and the output rod.

Figure 3:
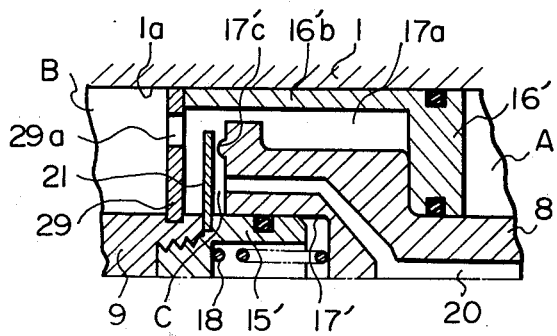
FIG. 3 is a partial sectional view showing the essential portion of a third embodiment of the invention.

In FIG. 3, a valve member 21 constituted by a resilient disc is secured to the output rod 9 and is clamped between the inner end of the output rod 9 and a cylindrical nut member 15' threaded to the output rod 9. A bore portion 17' is formed in the inner end of the input rod 8, and an annular valve seat 17'c is also formed on the input rod 8. An annular rigid disc 29 is secured to the output rod 8 to abut the free piston 16 and receives the differential pressure force therefrom.

Figure 4:
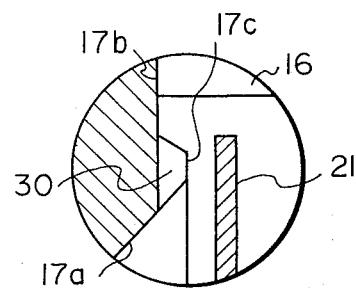
FIG. 4 is an enlarged partial sectional view showing the essential portion of another embodiment different from the embodiment of FIG. 1.

FIG. 4 is an enlarged partial view of the fourth embodiment of the invention wherein the valve seat 17c in the embodiment of FIG. 1 is modified to have one or more cut-outs or grooves 30 to maintain some amount of oil flow between the valve chamber C and the oil chamber B even when the valve member 21 engages with the valve seat 17c. Thus, the actuating devices such as the power steering device 32 provided downstream of the hydraulic force multiplying device of the invention can operate satisfactorily irrespective to the operating conditions of the hydraulic force multiplying device.

Figure 5:
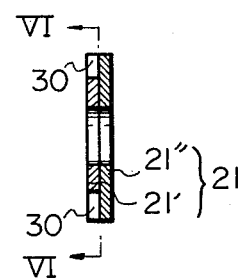
FIG. 5 is a sectional view of a valve disc different from the embodiment of FIG. 1.
Figure 6:
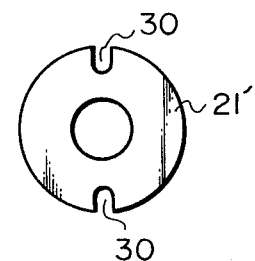
FIG. 6 is a plan view as viewed along line VI—VI in FIG. 5.

The cut-out or groove 30 need not necessarily be formed in the valve seat 17c but may be formed in the valve member 21 as shown in FIGS. 5 and 6. In the drawings, the valve member 21 is formed of two overlappingly disposed annular resilient discs 21' and 21'' with the disc 21' opposing the valve seat 17c. Two cut-outs 30 are formed in the disc 21' as shown in FIG. 6 to act as a fixed orifice or a leakage passage assuring the minimum flow across the valve.

In FIG. 2, there is illustrated a similar groove or cut-out 30' in the rigid valve member 21 to form the leakage passage. It will be noted that such leakage passage assures a flow across the chamber C or A and the chamber B even if the valve is fully closed and, therefore, the passage will be formed at a position separate from mutually engaging valve member and valve seat. The drawing shows a passage 30'' formed in the wall of the output rod to directly connect the valve chamber C with the oil chamber B. Further, the seal rings in the outer and inner circumferences of the free piston 16 may be omitted to assure a sufficient leakage flow across the chambers A and B.

From the foregoing it will be apparent that the present invention provides a hydraulic force multiplying device which can eliminate the impactive engagement between the valve member and the valve seat thus improving the operational feeling and preventing rupture or damage of the valve and extending the service life of the device, further, a communicating passage may be formed across the valve for assuring a predetermined minimum flow across the device whereby the device can be incorporated in a hydraulic system wherein a plurality of hydraulic devices are connected in series.

Those skilled in the art will appreciate that the invention can also be embodied in forms other than as herein disclosed for purposes of illustration.

What is claimed is:

1. A hydraulic force multiplying device comprising:
   a housing having an inlet port connected to a source of hydraulic pressure and an outlet port;
   an input rod and an output rod, one end of each of said input and output rods being slidably connected to one end of the other rod within said housing;
   a free piston slidably disposed between the outer circumference of the input rod and the inner wall of the housing and dividing the interior of the housing into an inlet side oil chamber and an outlet side oil chamber, said free piston being engaged with said output rod;
   a passage formed in said input rod for connecting the two oil chambers; and
   a valve for controlling oil flow in said passage, said valve having a valve member on one of said input and output rods and a valve seat member on the other of said input and output rods, one of said members being resiliently displaceable relative to the associated rod and in the direction of the axis of the rod, whereby when the input rod moves rapidly toward the output rod said valve element engages with said valve seat element for generating a differential pressure between the inlet and outlet chambers, and the input rod can move further toward and relative to the output rod by the resilient displacement of said one element.

2. A hydraulic force multiplying device as claimed in claim 1 wherein said rod having the valve member thereon consists of two rod elements which are connected with one another in the direction of the axis of the device with said valve member located therebetween.

3. A hydraulic force multiplying device as claimed in claim 2 wherein said valve member is an annular resilient disc with the inner periphery thereof clamped between said rod elements.

4. A hydraulic force multiplying device as claimed in claim 1 wherein said valve member is slidably mounted on said input rod and said valve seat is integral with said output rod.

5. A hydraulic force multiplying device as claimed in claim 4 further comprising a spring biasing said valve member toward said valve seat.

6. A hydraulic force multiplying device as claimed in claim 1 further comprising a spring positioned between said input and output rods and engaged by said rods and opposing movement of said rods toward each other.

7. A hydraulic force multiplying device as claimed in claim 1 wherein said valve has a communicating passage thereacross having a predetermined area and extending between said oil chambers when the valve member engages said valve seat member.

8. A hydraulic force multiplying device as claimed in claim 7 wherein said valve seat member is an annular valve seat having at least one cut-out portion therein constituting the communicating passage.

9. A hydraulic force multiplying device as claimed in claim 7 in which said valve member has at least one cut-out portion constituting the communicating passage.

* * * * *